United States Patent [19]

Stötzel et al.

[11] 4,022,088

[45] May 10, 1977

[54] PROCESS AND APPARATUS FOR THE CUTTING OF TRANSFORMER CORE SHEETS

[76] Inventors: Lothar Stötzel, Buschhuttener Strasse 87; Dieter Heider, Bottenbacher Strasse 73, both of 5910 Kreuztal-Buschhutten, Germany

[22] Filed: Mar. 18, 1976

[21] Appl. No.: 668,032

[52] U.S. Cl. .................................. 83/34; 83/36; 83/220; 83/556

[51] Int. Cl.² .................... B26D 3/24; H01F 7/06

[58] Field of Search .................. 83/556, 34, 79, 94, 83/35, 36, 219, 220

[56] References Cited

UNITED STATES PATENTS

| | | |
|---|---|---|
| 3,122,042 | 2/1964 | Littell et al. ................ 83/556 X |
| 3,338,123 | 8/1967 | Nelson ............................. 83/79 |
| 3,540,120 | 11/1970 | De Laurentis et al. .......... 83/34 X |

Primary Examiner—Willie G. Abercrombie
Attorney, Agent, or Firm—Young & Thompson

[57] ABSTRACT

Transformer core sheets are cut out by selectively intermittently advancing a metal strip and cutting off the ends at various angles by changing the cutting angle of a swivel-type cutting shear. Trapezoidal or parallelogram pieces are cut by cutting off the lengths of strip along shear lines alternately at 90° to each other. Hexagonal pieces are formed by severing the strip with one oblique cut, spacing the stock and the cut-off piece lengthwise from each other, and then cutting off a tip on each piece by a single cut that bridges the gap between the pieces, at 90° to the previous cut. For this purpose, the cut-off piece may be advanced or the stock retracted, or both, to space apart the stock and the cut-off piece. A further cutter, at right angles to strip travel, may be provided for cutting off tips of the workpieces previously obliquely cut, at right angles to the direction of strip movement.

10 Claims, 6 Drawing Figures

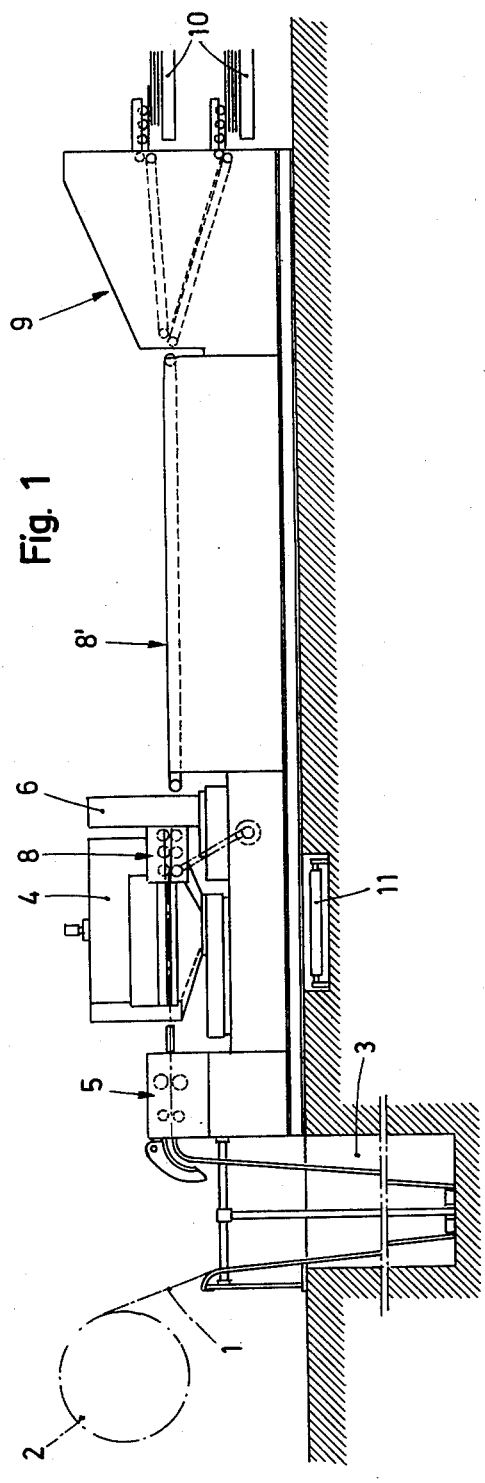
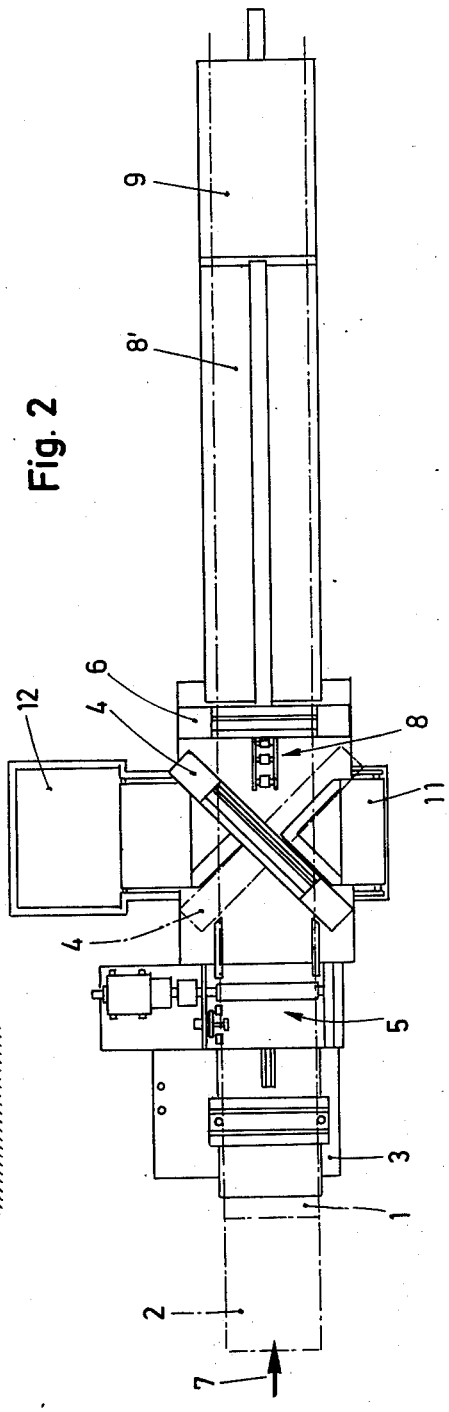

PROCESS AND APPARATUS FOR THE CUTTING OF TRANSFORMER CORE SHEETS

This invention relates to the cutting of transformer core sheets staked one on top of the other within the yoke and leg packs of a transformer core with overlapping edges to connect the yokes and legs in the manner of a mortise joint, wherein these sheets are reeled off continuously from a reel and are cut off from the strip under program control by means of a swivel-type cutting shear in trapezoidal or parallelogram configuration.

The invention is based on the problem of providing a process and apparatus making it possible to accomplish an economical, time-saving cutting operation on at least all of the leg sheets of a complete transformer core by electronic program control, i.e. fully automatically, namely inclusive of the transitions from one sheet configuration to another.

This problem is solved, in accordance with the invention, by cutting the sheets of all leg packs of a three-legged transformer core as a complete program in layers one behind the other to their final ready-for-use shape, which is achieved by first cutting the trapezoidal lateral leg sheets alternatingly for the first and second lateral legs by means of the swivel-type cutting shear, wherein optionally the apex of these sheets which leads in the conveying direction is cut off by a shear fixedly installed at right angles to the conveying direction; then cutting the parallelogram-shaped middle leg sheets by cutting off the front tip of the first of these sheets vertically to the last cutting edge, after the sheet strip has been retracted by an appropriate extent during the pivotal motion of the swivel-type cutting shear by the use of a reversible, first feed drive mechanism; thereupon executing the next oblique cut after further conveying the sheet strip in accordance with the predetermined length of the sheets and after swivelling the swivel-type cutting shear by 90°; then pulling the cut-off sheet forward by the aforementioned extent with the aid of a second feed drive mechanism arranged between the swivel-type cutting shear and the second shear and retracting the sheet strip by the same extent with the aid of the reversible, first feed drive mechanism, whereupon, after another pivotal motion of the swivel-type cutting shear, both sheet tips present in the cutting zone of the shear are cut off with a full cutting stroke of the shear; and advancing the cut-off middle leg sheet by the aforementioned extent during the transition in the program cycle from the middle leg sheet to the lateral leg sheets, the sheet strip being retracted by a greater extent, and only the rearward corner of the cut-off sheet is cut off by half a cutting stroke of the swivel-type cutting shear.

An apparatus of the invention to conduct this process has a feed drive mechanism in front of a swivel-type cutting shear and is characterized by a second feed drive mechanism behind the swivel-type cutting shear and by a fixed second shear arranged behind the second feed drive mechanism and cutting at right angles to the conveying direction. In this connection, the first feed drive mechanism is fashioned to be reversible, and the swivel-type cutting shear comprises a stop which can be activated and deactivated for the execution of half a cutting stroke.

The invention will now be described in greater detail with reference to the drawings which show an example of the invention, to wit:

FIG. 1 shows, in a lateral view, an apparatus for conducting the process of this invention;

FIG. 2 shows a top view of the apparatus according to FIG. 1;

FIG. 5 shows the change of the sheet form from the middle leg sheets of FIG. 4 to the lateral leg sheets of FIG. 3, while

Figure 3:
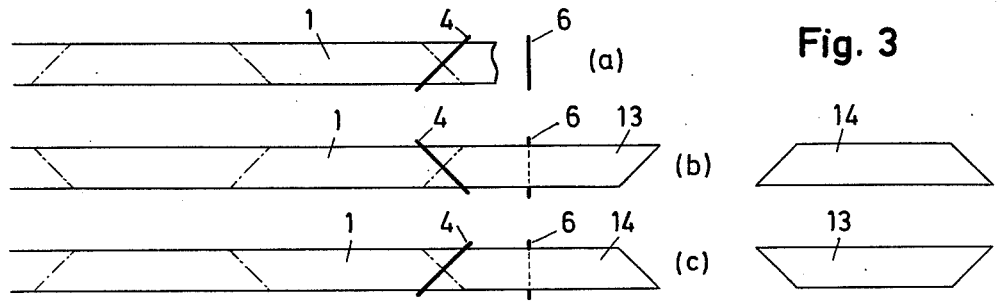
FIG. 3 shows the cutting sequence for the cutting of trapezoidal lateral leg sheets of a three-legged transformer core.

In the apparatus for the cutting of transformer sheets illustrated in FIGS. 1 and 2, the sheet strip 1 is wound off from a reel 2 and passes first of all through a loop trough 3 which can collect the sheet strip 1 if the feed is interrupted during the cutting of the sheets. Between the loop trough 3 and a swivel-type cutting shear 4, a first feed drive mechanism 5 is arranged which is reversible, which will be discussed in greater detail below. The swivel-type cutting shear 4 is followed by a second shear 6 at right angles to the conveying direction (see arrow 7 in FIG. 2), which latter shear is fixedly mounted; between the two shears 4 and 6 there is a second feed drive mechanism 8, namely in the maximally close proximity of the pivot point of the swivel-type cutting shear 4. One of the pivotal positions of the swivel-type cutting shear 4 is shown in full lines in FIG. 2, whereas the other pivotal position, offset by 90°, is indicated in dot-dash lines. A delivery table 8' follows the second shear 6; this table feeds the cut-off sheets, for example, to a guide means 9 for the equal-edged stacking of the sheets on pallets 10 (German Patent No. 1,221,974) or to another stacking apparatus. Underneath the swivel-type cutting shear 4, a conveyor belt 11 is disposed which runs at right angles to the conveying direction of the sheet strip 1 and transports the cutting scrap into a scrap pit 12.

All of the movements of the entire plant are controlled by an electronic program control. This also includes a stop, not shown, which can be retracted and extended, for the swivel-type cutting shear 4, making it possible for this shear to execute, within the program cycle, half a cutting stroke as will be explained hereinbelow with reference to FIGS. 3–5 which will now be discussed.

FIG. 3 shows the cutting sequence for the cutting of trapezoidal lateral leg sheets of a three-legged transformer core. FIG. 3 consists of three partial views (a), (b), and (c), illustrating the individual cutting operations. According to (a), the sheet strip 1 is first initially cut in part, the swivel-type cutting shear 4 being in one of its pivotal positions, as indicated. Reference numeral 4 is also utilized in FIGS. 3–5 for the cut, indicated by a bold line. The same holds true for numeral 6 of the second, not pivotable shear 6 which, however, is not operating during the cutting sequence of FIG. 3. After the cutting operations (a), the sheet strip 1 is advanced by means of the first feed drive mechanism 5 by the length of one lateral leg sheet 13 or 14, fixedly determined and regulated by the program, whereupon the cutting operation (b) is effected. The lateral leg sheet 13 has thus been produced. To execute the subsequent cut, the shear 4 is pivoted again into the first position, as in (a), and the sheet 14 is cut off.

The cutting of these trapezoidal lateral leg sheets 13 and 14 in the above-described manner is actually not novel; however, this operation is a part of the total program wherein also the transition from one sheet configuration to the other within the scope of the fully automatic program does not require any special measures and manual readjusting operations.

Figure 4:
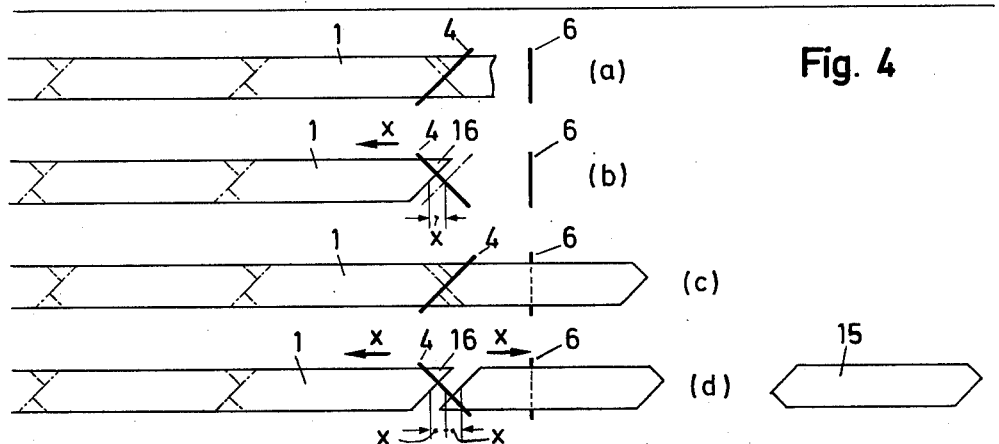
FIG. 4 shows the cutting sequence for middle leg sheets having the configuration of a parallelogram with obliquely cut off forward and rearward apices.

The cutting of the middle leg sheets 15 is illustrated in FIG. 4. If the program is not begun with the middle leg sheets 15 or if these sheets are not to be cut as the first sheets after a new sheet strip 1 has been supplied, namely by means of cutting operation (a), then the transition from the trapezoidal lateral leg sheet 14 to the parallelogram-shaped middle leg sheet 15 is accomplished by providing that the first, reversible feed drive mechanism 5 retracts the sheet strip 1 by the value $x$, and the front tip 16 of the sheet strip 1 (see cutting operation [b]) is cut off by the shear 4 after the pivoting of the shear, which can be effected simultaneously with the retraction of the sheet strip 1. The tip 16 is conveyed as scrap into the scrap pit 12 with the aid of the conveyor belt 11 (FIGS. 1 and 2).

Thereupon, the sheet strip 1 is again advanced by the predetermined length of the middle leg sheet 15 plus $x$. The swivel cutting shear 4 has returned, in the meantime, into its other pivotal position and presently cuts off the subsequent sheet 15, since the strip 1 is stationary; however, this subsequent sheet still has a pointed rear end (see cutting operation [c]). In order to cut off also this rear tip 17 and simultaneously also the front tip 16 of the subsequent sheet 15, after the shear 4 has again been pivoted, the sheet strip 1 is retracted by the value $x$ by means of the first, reversible feed drive mechanism 5, and simultaneously the sheet 15 is advanced by the same value $x$ with the aid of the second feed drive mechanism 8, so that the shear 4 cuts off the tips 16 and 17 with a full cutting stroke (cutting operation [c]). The next cutting processes (b), (c), (d) are then conducted in the same way. The intended cuts are indicated in dot-dash lines at the sheet strip 1.

Figure 5:
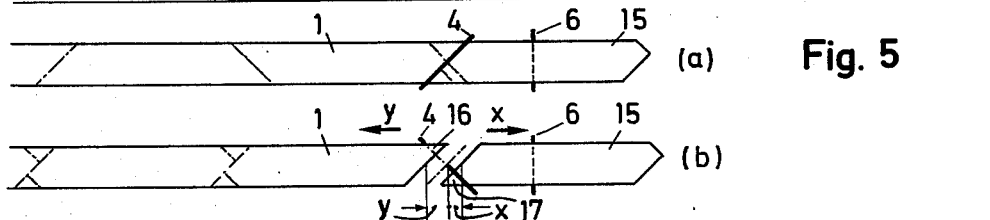

FIG. 5 shows the transition within the total program from the middle leg sheet 15 to the lateral leg sheets 13 and 14 according to FIG. 3. During cutting operation (a), the last middle leg sheet 15 of this sequence is cut off. In order to cut off the rearward tip 17 of the last middle leg sheet 15, without simultaneously cutting off another front tip 16 from the sheet strip 1, the procedure is as follows: The shear 4 is brought into the other pivotal position; the cut-off sheet 15 is advanced by the value $x$ with the aid of the second feed drive mechanism 8; the sheet strip 1 is retracted by a larger value $y$ with the aid of the first feed drive mechanism 5; and the aforementioned stop of the swivel-type cutting shear 4 is activated, so that the shear only executes half a cutting stroke and accordingly cuts off only the rearward tip 17. The larger value $y$ serves for safety purposes, so that the swivel-type cutting shear 4 during the execution of the half-way cutting stroke will nowise touch the inclined forward cutting edge of the sheet strip 1. To cut off the subsequent lateral leg sheet 13, which is the first in this sequence, the sheet strip 1 is advanced by the means length plus $y$. Now follows the cutting step (b) according to FIG. 3. The shear 4 remains in its preceding pivotal position, but again executes a full cutting stroke, since the stop has been deactivated, i.e. removed from the path of motion of the top blade carrier (not shown by itself).

As is known, the sheet packs (leg and yoke packs) of a transformer core are stacked so that they overlap with corresponding edge strips in such a manner that the butt joints are alternatively offset and consequently the leg and yoke packs are "mortised" together at the butt joints. This has the result in certain transformer cores that the sharp tips of the lateral leg sheets 13 or 14 project, which frequently is undesirable. However, it is possible within the scope of the presently described process and by means of the disclosed apparatus to cut off these otherwise projecting tips. For this reason, the second, fixedly installed shear 6 is provided which is actuated if necessary.

Figure 6:
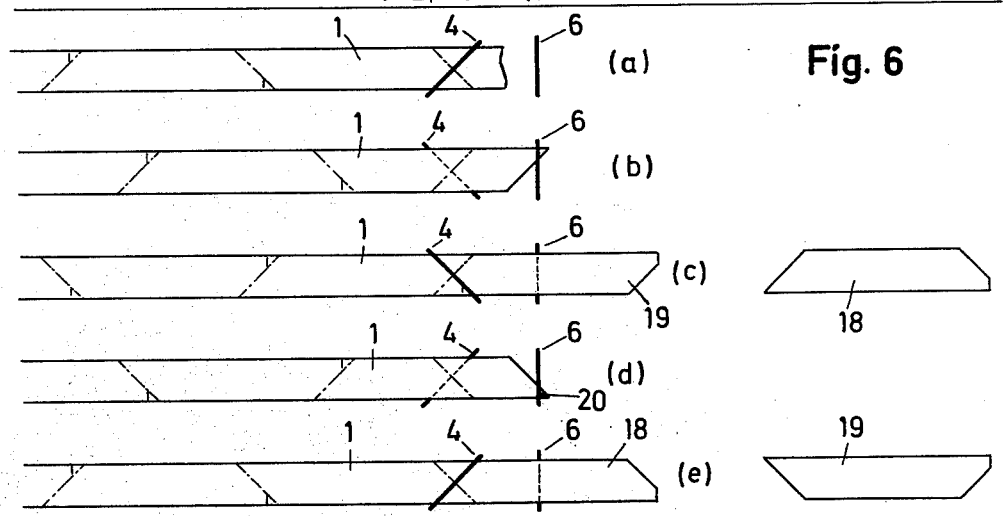
FIG. 6 represents the cutting sequence for the cutting of another possible type of lateral leg sheets.

FIG. 6 shows the cutting sequence for such a lateral leg sheet 18 or 19. At the beginning of a sheet strip 1, an oblique initial cut is first executed with the swivel-type cutting shear 4, namely as cutting operation (a) in FIG. 6. Then, as cutting operation (b), the small tip 20, which otherwise projects in the finished transformer core, is cut off by the fixedly mounted shear 6. The sheet strip 1 is further advanced, and in the meantime the swivel-type cutting shear 4 has been pivoted so that it now cuts, as cutting operation (c), the lateral leg sheet 19 in an oblique direction. Then follows the next advancing step to cut off the small tip 20 of the subsequent lateral leg sheet 18. This is cutting operation (d) in FIG. 6. Thereupon, the lateral leg sheet 18 is cut off after an appropriate advancing of the latter and swiveling of the shear 4. This is illustrated in FIG. 6 as cutting operation (e).

All of the cutting steps and advancements are effected, as mentioned above, fully automatically with program control, wherein non-contacting contacts (not shown) are used for the fixation and monitoring of the respective position of the sheet strip 1.

What we claim is:

1. In a process for the cutting of transformer core sheets to be stacked one on top of the other within the yoke and the leg packs of a transformer core with overlapping edges to mortise the yokes and legs together, in which a continuous strip of metal is fed lengthwise to a cutting station in which a swivel-type cutting shear cuts off workpieces in trapezoidal or parallelogram form along shear lines oblique to the length of the strip; the improvement comprising cutting the strip along a first said oblique shear line, turning the cutting shear until it is oppositely obliquely positioned relative to said first shear line, spacing the cut-off portion of the strip from the remainder of the strip in a direction lengthwise of the strip, and cutting off the rear tip of said cut-off portion and the forward tip of said remainder of the strip along a single second shear line perpendicular to the first said shear line.

2. A process as claimed in claim 1, and spacing apart said cut-off portion and said remainder of the strip by moving said cut-off portion forward relative to said remainder of said strip.

3. A process as claimed in claim 2, and spacing said cut-off portion and said remainder of said strip apart by retracting said remainder of said strip.

4. A process as claimed in claim 1, and spacing said cut-off portion and said remainder of said strip apart by retracting said remainder of said strip.

5. A process as claimed in claim 1, and cutting off a tip of said strip at right angles to the direction of movement of said strip with a further cutting shear spaced from said swivel-type cutting shear in the direction of advance of said strip, after said swivel-type cutting shear has produced an oblique forward edge on said strip.

6. A process as claimed in claim 1, and changing from the production of hexagonal cut-off pieces to trapezoidal or parallelogram cut-off pieces, by cutting off a rear tip of a said cut-off portion along said second shear line without cutting off the forward tip of the remainder of said strip along said second shear line.

7. Apparatus for the cutting of transformer core sheets to be stacked one on top of the other within the yoke and leg packs of a transformer core with overlapping edges to mortise the yokes and legs together, comprising in combination means to advance a continuous strip of metal lengthwise toward a cutting station, a swivel-type cutting shear disposed in said cutting station for cutting off pieces of said strip along shear lines that are alternately oppositely obliquely angled relative to the length of the strip, means to advance said cut-off portions further in the direction of movement of said strip, and means to retract the remaining portion of said strip in a direction opposite the direction of advance of said strip.

8. Apparatus as claimed in claim 7, said last-named means comprising reversible power-driven roll means for selectively advancing and retracting said strip.

9. Apparatus as claimed in claim 7, and a further cutting shear spaced from said swivel-type cutting shear in the direction of advance of said strip and so disposed as to cut off tips of said strips at a right angle to the direction of advance of the strip.

10. Apparatus as claimed in claim 9, said means to advance said cut-off portion of said strip comprising power-driven rolls disposed between the two said shears.

* * * * *